Jan. 18, 1944. J. BAILEY ET AL 2,339,451
METHOD OF AND MEANS FOR CONTROLLING THE VISCOSITY
OF EXTRUDED PLASTIC RIBBONS
Filed May 13, 1942
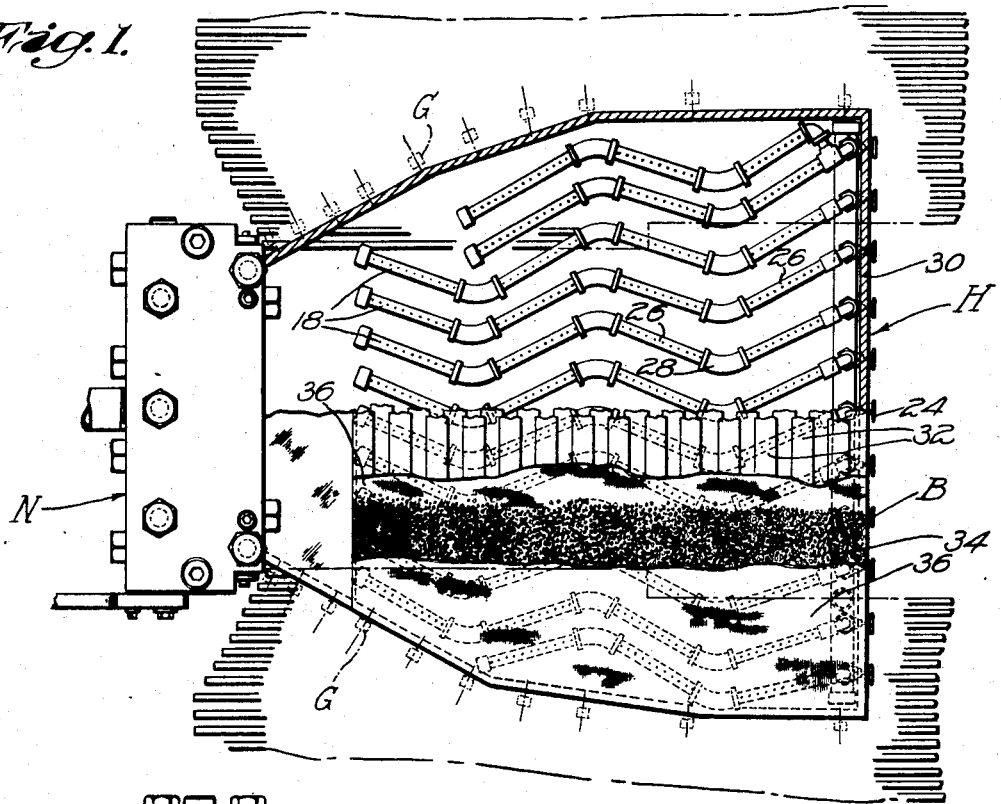
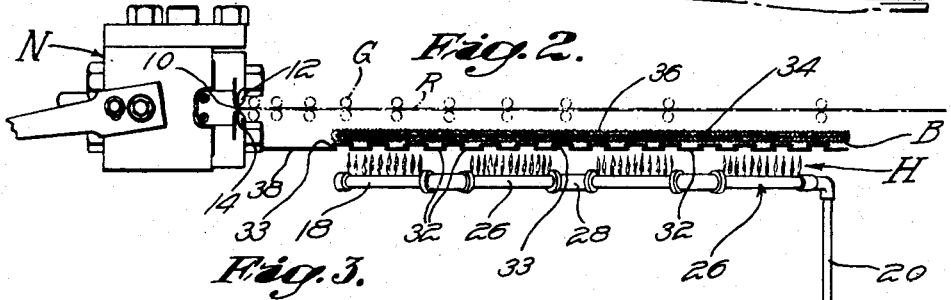
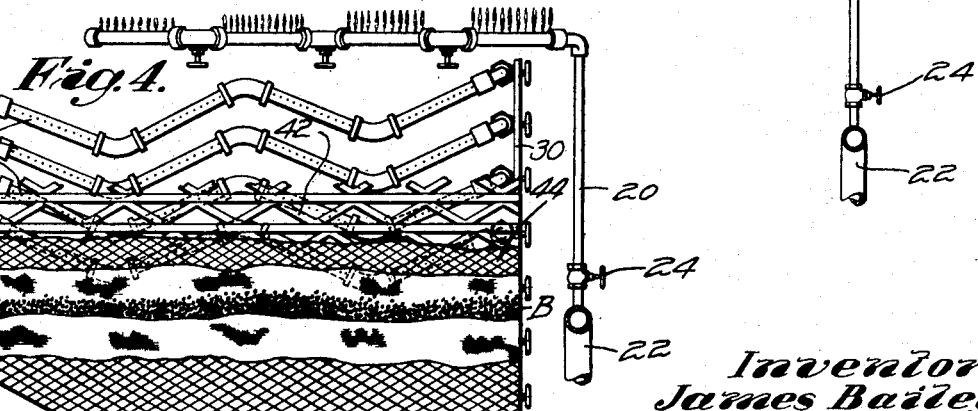
Inventors
James Bailey
Raymond S. Jestonowski Patented Jan. 18, 1944

2,339,451

UNITED STATES PATENT OFFICE 2,339,451

METHOD OF AND MEANS FOR CONTROLLING THE VISCOSITY OF EXTRUDED PLASTIC RIBBONS

James Bailey, West Hartford, and Raymond S. Jesionowski, Hartford, Conn., assignors to Plax Corporation, Hartford, Conn., a corporation of Delaware Application May 13, 1942, Serial No. 442,845

11 Claims. (Cl. 18—12)

The present invention relates to "dry process" extrusion of an organic plastic sheet or ribbon; the term "dry process" meaning that the plastic compound which is extruded is "solvent-free" or free of solvents of the volatile type, such as acetone or alcohol.

The process and apparatus for "dry process" extrusion for organic plastic sheet or ribbon are fully described in the copending application of James Bailey, Serial No. 423,912 filed December 22, 1941, and which on September 29, 1942, issued as United States Patent No. 2,297,645. As therein pointed out, upon the ribbon leaving the extrusion nozzle, it is necessary to control the viscosity thereof as the ribbon is transversely stretched, as well as to protect the ribbon from chilling drafts which will deform or injure it, and to accomplish the foregoing without marring the surface thereof.

More specifically, the object of the present invention is to provide an improved method and apparatus for accomplishing the aforestated purposes.

Another object is to provide improved means for controlling the viscosity of the extruded ribbon as it leaves the extrusion nozzle by subjecting the same to heat and wherein the degree of heat applied to any portion of the ribbon may be accurately controlled.

Another object is to provide means for controlling the viscosity of the ribbon by applying heat thereto and wherein the heat is so applied that it will be evenly distributed and diffused to prevent line scorching or excessive heating and stretching of a longitudinal portion of the ribbon.

A still further object is to provide heating means of extremely simple construction wherein the various parts thereof may be readily and economically replaced and rapidly and readily renewed or interchanged.

Other objects will be in part obvious and in part pointed out more in detail hereinafter.

The invention accordingly consists in the features of construction, combination of elements, and arrangement of parts which will be exemplified in the construction hereafter set forth and the scope of the application of which will be indicated in the appended claims.

In the accompanying drawing:

Figure 1 is a plan view of the heating means embodying the present invention; the heating means being partially broken away to show details of construction and diagrammatically showing the extrusion and ribbon supporting means;

Fig. 2 is a vertical sectional elevation of the construction shown in Fig. 1;

Fig. 3 is a view of a modified form of burner for the heating means; and

Fig. 4 is a view of another heating means embodying the invention herein.

Referring to the drawing, the plastic material after preparatory conditioning enters the nozzle N and is extruded through the extrusion slot 10 defined by top and bottom adjustable lips 12 and 14 into a continuous sheet or ribbon R. Upon leaving the nozzle, the edges of the ribbon are immediately gripped by gripping means G diagrammatically shown in Figs. 1 and 2; the first series of gripping means also functioning to chill the sheet or ribbon edges to provide hardened edge portions between which the body part of the ribbon is thereafter supported. In addition to supporting the ribbon, the gripping means are arranged in paths diverging from the nozzle to thereby subject the ribbon to transverse tension and stretch it to a desired width. Preferably, the ribbon is also subjected to longitudinal tension, partly by the gripping means G and by suitable pulling means, such as shown in said Patent No. 2,297,645, engaging a cool portion of the ribbon.

In order to control the viscosity of the ribbon during these initial operations, there is located adjacent the nozzle N heating means H; these means being horizontally positioned beneath and out of contact with the ribbon R. More specifically, the heating means comprises a plurality of transversely spaced, longitudinally extending heating elements 18; each element in the embodiment shown being a gas burner. Each burner is relatively long and is closed at the end adjacent the nozzle and at the other end connects to a riser 20 extending from a main gas main 22. As best seen in Figs. 2 and 3, each riser 20 has arranged therein a control valve 24 whereby the flow of gas therethrough may be accurately controlled to thus vary the heat created by each burner and to permit control of any element individually of any other element.

In order to more evenly distribute the heat and likewise prevent line scorching or excessive heating of a longitudinal portion of the ribbon, each element 18 extends longitudinally of the path of travel of the ribbon R in a zigzag or serpentine path. To accomplish this, each element may consist of a plurality of sections 26; each section being connected to the next succeeding section by angle fittings 28 of approximately 120° and each successive fitting being reversed relative to the preceding fitting. The heating elements 18 are positioned well below the ribbon R and located within a frame 30 having side walls diverging outwardly from the nozzle in like manner to the gripping means, and it will be noted that to compensate for the narrower section adjacent the nozzle the side heating elements 18 are somewhat shorter than those in the center. As a result of this arrangement, the ribbon is heated along approximately longitudinal elongated zones arranged transversely of the ribbon, and the heat from each element is directed towards a respective longitudinal zone along lines at angles to the direction of travel of the ribbon so that various portions of the ribbon in a zone are intermittently heated. This prevents line scorching or excessive heating and stretching of the ribbon along localized longitudinal lines which would result if the heat were applied continuously along a longitudinal line.

In order to prevent direct impingement of the flame on the ribbon, the frame 30 forms a support for diffusing means including a plurality of transversely arranged metal strips 32 alternately arranged one above the other with their edges in overlapping but slightly spaced relationship. Supported on the transversely arranged metal strips 32 is a diffusing bed B comprising a substantial layer of pulverulent ceramic or other heat resisting granular material 34 enclosed within a close-mesh screening 36. In this way it will be seen that the heat created by the burners will circulate upwardly through the spacings 33 between the metal strips 32 to heat the bed B which directly underlies the ribbon R, whereby the ribbon will be heated by radiant heat, and all direct impingement of the flames on the ribbon is prevented.

In order to protect that portion of the ribbon immediately adjacent the nozzle from chilling drafts, the frame 30 further supports a baffle 38 arranged intermediate the ends of the elements 18 and the nozzle N; this baffle cooperating with the heating means to protect the sheet or ribbon throughout the zone of transverse stretching and the heating means protecting it for a distance therebeyond.

With the foregoing arrangement it will be seen that the viscosity of the ribbon R upon its leaving the nozzle may be accurately controlled by controlling the heat created by the heating means H. This is necessary for various reasons. For example, it will be appreciated that because of the size of the nozzle N and the extremely small opening of the nozzle slot it is difficult at times to accurately set the nozzle slot so that the extruded ribbon will be of equal thickness throughout its width. If an accurate setting is not made and the extruded ribbon is of greater thickness at one side than at the other, then, if the thicker portion should be cooler and therefore more viscous than the thinner portion, more heat may be applied by increasing the flames of the burners to the thick side of the ribbon by manipulation of the necessary individual burner control valves 24, thus causing the plastic of this portion of the ribbon to flow and stretch more than the thinner portion of the ribbon during the transverse tensioning, whereby the thickness of the finished sheet may be made uniform. On the other hand, the thinner portion may be cooler and therefore have more resistance to stretching than the thicker portion, in which case the heat in the zone or zones of the thinner portion would be increased. In other words, the heating in the several zones would be selectively regulated in accordance with variations in resistance of the portions of the ribbon to stretch. In addition to variations in thickness as the ribbon leaves the nozzle, there also may be a variation in temperature or temperature gradient across the ribbon due to a temperature drop across the nozzle. This drop may approximate 11° F. and must be compensated for in order to have the finished product of uniform thickness.

Likewise, as previously explained, upon the ribbon leaving the nozzle it is immediately engaged by gripping rolls which chill the edges thereof, and to prevent this chill from extending inwardly of the edges of the ribbon, the heating elements 18 adjacent the side edges may be adjusted to create more heat than those at the center of the ribbon. This heating of the sheet adjacent the side edges also prevents riffling of the sheet inwardly of the chilled edges by permitting plastic flow thereof under the transverse tensioning. If it is also desired to control the longitudinal heating effect of the elements 18, each of the fittings 28 may also be provided with a control valve as shown in Fig. 3.

It will be seen that by spacing the elements 18 transversely of the ribbon each element or groups of adjacent elements in effect provides an independent longitudinal heating zone whereby the temperature of the bed B immediately above same may be raised or lowered by increasing the heat produced by the element or groups thereof. As a result, the ribbon R in effect passes over a plurality of heating zones, all of which may be adjusted to produce the same temperature, or each one of which may be adjusted to produce a higher or lower temperature, as desired, to control the temperature or maintain the desired temperature gradient transversely of the ribbon particularly where it is being stretched transversely.

Referring now to the embodiment illustrated in Fig. 4, the heating elements 18 are similar to those shown in Figs. 1 and 2. However, in this embodiment there is supported on the frame 30 a relatively heavy metal grille 42 of expanded metal, thus providing substantial open areas through which the flames of the heating elements may project. Immediately above the expanded metal grille 42 there is provided an open-mesh screen 44, and upon this screen is supported the ceramic bed B. It will be noted in this embodiment that the grille 42 and screen 44 may each be made of one piece, thus facilitating the assembly and interchangeability of the parts.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which as a matter of language, might be said to fall therebetween.

We claim as our invention:

1. The method of forming a sheet of solvent-free organic thermoplastic material which comprises continuously extruding the material through a nozzle to form a flat ribbon, gripping the edges of said ribbon near said nozzle and for a substantial distance beyond said nozzle and stretching the ribbon transversely to widen it and reduce its thickness, applying heat to said ribbon as it is being stretched from transversely arranged approximately longitudinally elongated heating zones, and regulating the heating in each zone so as to maintain a temperature gradient transversely of said ribbon in accordance with variations in resistance to stretch in the sheet so that a sheet of substantially uniform thickness is obtained.

2. The method of forming a sheet of solvent-free organic thermoplastic material which comprises continuously extruding the plastic in a viscous condition through a nozzle to form a flat ribbon, gripping the edges of the ribbon and stretching it transversely to widen it and reduce its thickness, applying heat to said ribbon from transversely arranged approximately longitudinally elongated zones, diffusing said heat to prevent excessive localized heating of the ribbon, and selectively regulating the heat from said zones in accordance with transverse variations in temperatures and viscosity of the ribbon to cause said ribbon to stretch into a sheet of uniform thickness.

3. The method of forming a sheet of organic solvent-free thermoplastic material which comprises continuously extruding the material in a viscous state through a nozzle to form a flat ribbon, gripping the edges of the ribbon near the nozzle and for a substantial distance beyond said nozzle and transversely stretching the ribbon to widen it and reduce its thickness, applying heat to the ribbon to control its temperature and viscosity for stretching from transversely arranged approximately longitudinally elongated zones, and directing the heat from each zone towards the ribbon along successive lines disposed at angles to the longitudinal direction of travel of the ribbon so that the various portions of the ribbon in each zone are intermittently heated and excessive heating and stretching of the ribbon along localized longitudinal lines are prevented.

4. The method of forming a sheet of solvent-free thermoplastic material which comprises continuously extruding the material in a viscous state through a nozzle to form a flat ribbon, gripping the edges of said ribbon near said nozzle and for a substantial distance beyond said nozzle and transversely stretching the ribbon to widen it and reduce its thickness, applying heat to said ribbon to control its temperature and viscosity for stretching from transversely arranged approximately longitudinally elongated zones, directing the heat from each zone towards the ribbon along lines at angles to the direction of travel of the ribbon to prevent excessive heating and stretching of the ribbon along localized longitudinal lines, and selectively regulating the heating from said zones in accordance with the transverse variations in temperature and viscosity of the ribbon to cause said ribbon to stretch into a sheet of uniform thickness.

5. Means for forming a sheet of solvent-free organic thermoplastic material comprising a nozzle through which the plastic is extruded in a viscous state to form a flat ribbon, means for gripping the edges of the ribbon near the nozzle and for a substantial distance beyond said nozzle and stretching it transversely to widen it and reduce its thickness, heating means disposed beneath said sheet and approximately co-extensive with the area in which it is stretched and arranged to heat said ribbon from transversely arranged approximately longitudinally elongated zones, and means for regulating the heating means in said zones so as to maintain a temperature gradient transversely of said ribbon in accordance with the variations in temperature and viscosity in the sheet.

6. Means for forming a sheet of solvent-free organic thermoplastic material comprising a nozzle through which the material is extruded in a viscous state to form a flat ribbon, means for gripping the edges of said ribbon and stretching it transversely to widen it and reduce its thickness, means for applying heat to said ribbon from transversely arranged approximately longitudinally elongated zones, means between said heating means and ribbon for diffusing the heat to prevent excessive localized heating of the ribbon, and means for selectively regulating the heating means in the several zones in accordance with transverse variations in temperature and viscosity of the ribbon to cause said ribbon to stretch into a sheet of uniform thickness.

7. Means for forming a sheet of solvent-free organic thermoplastic material comprising a nozzle through which the plastic is extruded in a viscous state to form a flat ribbon, means for gripping the edges of said ribbon near the nozzle and for a substantial distance beyond said nozzle and transversely stretching the ribbon to widen it and reduce its thickness, means for applying heat to said ribbon from transversely arranged approximately longitudinally elongated zones and along successive lines in each zone at angles to the direction of travel of the ribbon so as to control its temperature and viscosity for stretching without excessively heating and stretching the ribbon along localized longitudinal lines.

8. Means for forming a sheet of solvent-free organic thermoplastic material comprising a nozzle through which the material is extruded in a viscous state to form a flat ribbon, means for gripping the edges of the ribbon and stretching it transversely to widen it and reduce its thickness, heating means disposed beneath said ribbon approximately co-extensive with the area in which it is stretched, said heating means comprising a plurality of transversely spaced generally longitudinally extending heating elements, and means for selectively regulating said heating elements so as to maintain a temperature gradient transversely of the sheet in accordance with variations in temperature and viscosity thereof.

9. Means for forming a sheet of solvent-free organic thermoplastic material comprising a nozzle through which the material is extruded in a viscous state to form a flat ribbon, means for gripping the edges of the ribbon and stretching it transversely to widen it and reduce its thickness, heating means disposed beneath said ribbon approximately co-extensive with the area in which it is stretched, said heating means comprising a plurality of transversely spaced generally longitudinally extending heating elements, means positioned between said heating means and the ribbon for diffusing the heat created by said elements and thereby prevent excessive heating and stretching of the ribbon along localized longitudinal lines, and means for selectively regulating said heating elements so as to maintain a temperature gradient transversely of the sheet in accordance with variations in viscosity thereof.

10. Means for forming a sheet of solvent-free organic thermoplastic material comprising a nozzle through which the material is extruded in a viscous state to form a flat ribbon, means for gripping the edges of the ribbon and stretching it transversely to widen it and reduce its thickness, and heating means disposed beneath said ribbon approximately co-extensive with the area in which it is stretched, said heating means comprising a plurality of transversely spaced longitudinally extending heating elements of zig-zag form so that the heat from the elements is directed along zig-zag paths in transversely arranged longitudinally extending zones.

11. Means for forming a sheet of solvent-free organic thermoplastic material comprising a nozzle through which the material is extruded in a viscous state to form a flat ribbon, means for gripping the edges of the ribbon and stretching it transversely to widen it and reduce its thickness, heating means disposed beneath said ribbon approximately co-extensive with the area in which it is stretched, said heating means comprising a plurality of transversely spaced longitudinally extending heating elements of zig-zag form so that the heat from the elements is directed along zig-zag paths in transversely arranged longitudinally extending zones, and diffusing means positioned between said elements and ribbon and including a bed of heat retaining material.

JAMES BAILEY.
RAYMOND S. JESIONOWSKI.